United States Patent
Ge et al.

(10) Patent No.: US 9,551,303 B2
(45) Date of Patent: Jan. 24, 2017

(54) EXHAUST GAS RECIRCULATION SYSTEM FOR AN INTERNAL COMBUSTION ENGINE AND METHOD FOR OPERATING SAME

(71) Applicant: Caterpillar Inc., Peoria, IL (US)

(72) Inventors: Xinyu Ge, Peoria, IL (US); Yongli Qi, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 307 days.

(21) Appl. No.: 14/489,685

(22) Filed: Sep. 18, 2014

(65) Prior Publication Data

US 2016/0084204 A1    Mar. 24, 2016

(51) Int. Cl.
| | |
|---|---|
| F02M 25/07 | (2006.01) |
| F02D 41/00 | (2006.01) |
| F02D 41/14 | (2006.01) |
| F02D 19/10 | (2006.01) |
| F02B 1/12 | (2006.01) |

(52) U.S. Cl.
CPC .......... *F02M 25/0737* (2013.01); *F02D 19/10* (2013.01); *F02D 41/0032* (2013.01); *F02D 41/0065* (2013.01); *F02D 41/1446* (2013.01); *F02M 25/072* (2013.01); *F02M 25/0717* (2013.01); *F02M 26/05* (2016.02); *F02M 26/28* (2016.02); *F02M 26/33* (2016.02); *F02M 26/47* (2016.02); *F02B 1/12* (2013.01); *F02D 2041/0067* (2013.01)

(58) Field of Classification Search
CPC ........ F02M 26/32; F02M 26/14; F02M 26/17; F02M 26/05; F02M 26/28; F02M 26/33; F02M 26/47; F02D 41/0047; F02D 41/0065; F02D 41/1446; F02D 41/0032
See application file for complete search history.

(56) References Cited

U.S. PATENT DOCUMENTS

| | | | |
|---|---|---|---|
| 6,907,870 B2 | 6/2005 | zur Loye et al. |
| 7,322,193 B2 | 1/2008 | Bering et al. |
| 7,377,270 B2 | 5/2008 | Duffy et al. |
| 7,621,262 B2 | 11/2009 | Zubeck |
| 7,950,231 B2 | 5/2011 | Vuk |
| 8,495,874 B2 | 7/2013 | Lippa et al. |

(Continued)

FOREIGN PATENT DOCUMENTS

| | | |
|---|---|---|
| JP | H07238870 A | 9/1995 |
| JP | 2009180100 A | 8/2009 |
| WO | 2012/108796 A1 | 8/2012 |

*Primary Examiner* — Jacob Amick
(74) *Attorney, Agent, or Firm* — Baker & Hostetler LLP

(57) ABSTRACT

An exhaust gas recirculation (EGR) system includes an EGR duct configured to effect fluid communication between an exhaust duct and an intake duct of an internal combustion engine; a heat exchanger having a first flow passage and a second flow passage, the first flow passage being in fluid communication with the EGR duct, the second flow passage being configured to receive a heat transfer medium from a heat transfer medium source; an upstream purge valve in fluid communication with the second flow passage of the heat exchanger, and configured to effect selective fluid communication between a purge fluid source and the second flow passage of the heat exchanger; and a controller operatively coupled to the upstream purge valve. The controller is configured to purge the second flow passage of the heat exchanger by opening the upstream purge valve.

20 Claims, 5 Drawing Sheets

(56) References Cited

U.S. PATENT DOCUMENTS

| | | |
|---|---|---|
| 2005/0279093 A1 | 12/2005 | Wang et al. |
| 2009/0271094 A1 | 10/2009 | Stablein et al. |
| 2011/0146637 A1 | 6/2011 | Kang et al. |
| 2011/0209473 A1 | 9/2011 | Fritz et al. |
| 2012/0124992 A1 | 5/2012 | Fiveland |
| 2013/0333673 A1 | 12/2013 | Frick et al. |
| 2014/0060489 A1* | 3/2014 | Iwai .................. F02B 23/101 123/478 |

* cited by examiner

EXHAUST GAS RECIRCULATION SYSTEM FOR AN INTERNAL COMBUSTION ENGINE AND METHOD FOR OPERATING SAME

TECHNICAL FIELD

This patent disclosure relates generally to internal combustion engines and, more particularly, to exhaust gas recirculation systems and methods for internal combustion engines.

BACKGROUND

Reciprocating internal combustion (IC) engines are known for converting chemical energy stored in a fuel supply into mechanical shaft power. A fuel-oxidizer mixture is received in a variable volume of an IC engine defined by a piston translating within a cylinder bore. The fuel-oxidizer mixture burns inside the variable volume to convert chemical energy from the mixture into heat. In turn, expansion of the combustion products within the variable volume performs work on the piston, which may be transferred to an output shaft of the IC engine.

Variations in the temperature of an oxidizer stream entering an engine are known to affect engine performance. For example, exhaust gas recirculation (EGR) may be used to modify a temperature of the flow of oxidizer entering the IC engine in addition to an oxygen concentration of the oxidizer flow. The EGR flow may be cooled through an EGR cooler to adjust a temperature, water mole fraction, or both, of the EGR flow.

U.S. Pat. No. 7,621,262 (the '262 patent), entitled "Hybrid Thermal Energy Conversion For HCCI Heated Intake Charge System," describes a method for operating an internal combustion engine coupled to a hybrid power train, whereby waste energy from a component of an electrical power system is used to heat intake air during homogeneous charge compression ignition operation of the engine. According to the '262 patent, a heat exchanger harvests vehicle thermal energy and an electric heater harvests waste electrical energy to heat intake air. Further, the '262 patent describes an EGR cooler for cooling an EGR flow.

However, the intake thermal management described by the '262 may be an expensive and complex retrofit for a vehicle not already having a hybrid powertrain. Accordingly, the present disclosure addresses the aforementioned problems and/or other problems in the art.

SUMMARY

According to an aspect of the disclosure, an exhaust gas recirculation (EGR) system for an internal combustion engine comprises an EGR duct configured to effect fluid communication between an exhaust duct and an intake duct of the internal combustion engine; a heat exchanger having a first flow passage and a second flow passage, the first flow passage being in fluid communication with the EGR duct, the second flow passage being configured to receive a heat transfer medium from a heat transfer medium source; an upstream purge valve in fluid communication with the second flow passage of the heat exchanger, and configured to effect selective fluid communication between a purge fluid source and the second flow passage of the heat exchanger, the purge fluid source being distinct from the heat transfer medium source; and a controller operatively coupled to the upstream purge valve. The controller is configured to purge the second flow passage of the heat exchanger at least in part by opening the upstream purge valve.

Another aspect of the disclosure provides a method for operating an exhaust gas recirculation (EGR) system of an internal combustion engine. The EGR system includes an EGR duct in fluid communication with an exhaust duct and an intake duct of the internal combustion engine, and a heat exchanger having a first flow passage and a second flow passage, the first flow passage being in fluid communication with the EGR duct, the second flow passage being in fluid communication with a heat transfer medium source. The method comprises purging a heat transfer medium out of the second flow passage of heat exchanger using a purge fluid, the heat transfer medium being distinct from the purge fluid.

According to another aspect of the disclosure, an internal combustion engine comprises a block defining a cylinder bore therein; a piston disposed in reciprocal sliding engagement with the cylinder bore, the cylinder bore and the piston defining a variable volume; an exhaust duct in selective fluid communication with the variable volume; an intake duct in selective fluid communication with the variable volume; an EGR duct in fluid communication with the exhaust duct and the intake duct; a heat exchanger having a first flow passage and a second flow passage, the first flow passage being in fluid communication with the EGR duct, the second flow passage being in fluid communication with a heat transfer medium source; an upstream purge valve in fluid communication with the second flow passage of the heat exchanger, and configured to effect selective fluid communication between a purge fluid source and the second flow passage of the heat exchanger, the purge fluid source being distinct from the heat transfer medium source; and a controller operatively coupled to the upstream purge valve. The controller is configured to purge the second flow passage of the heat exchanger at least in part by opening the upstream purge valve.

DETAILED DESCRIPTION

Aspects of the disclosure will now be described in detail with reference to the drawings, wherein like reference numbers refer to like elements throughout, unless specified otherwise.

Figure 1:
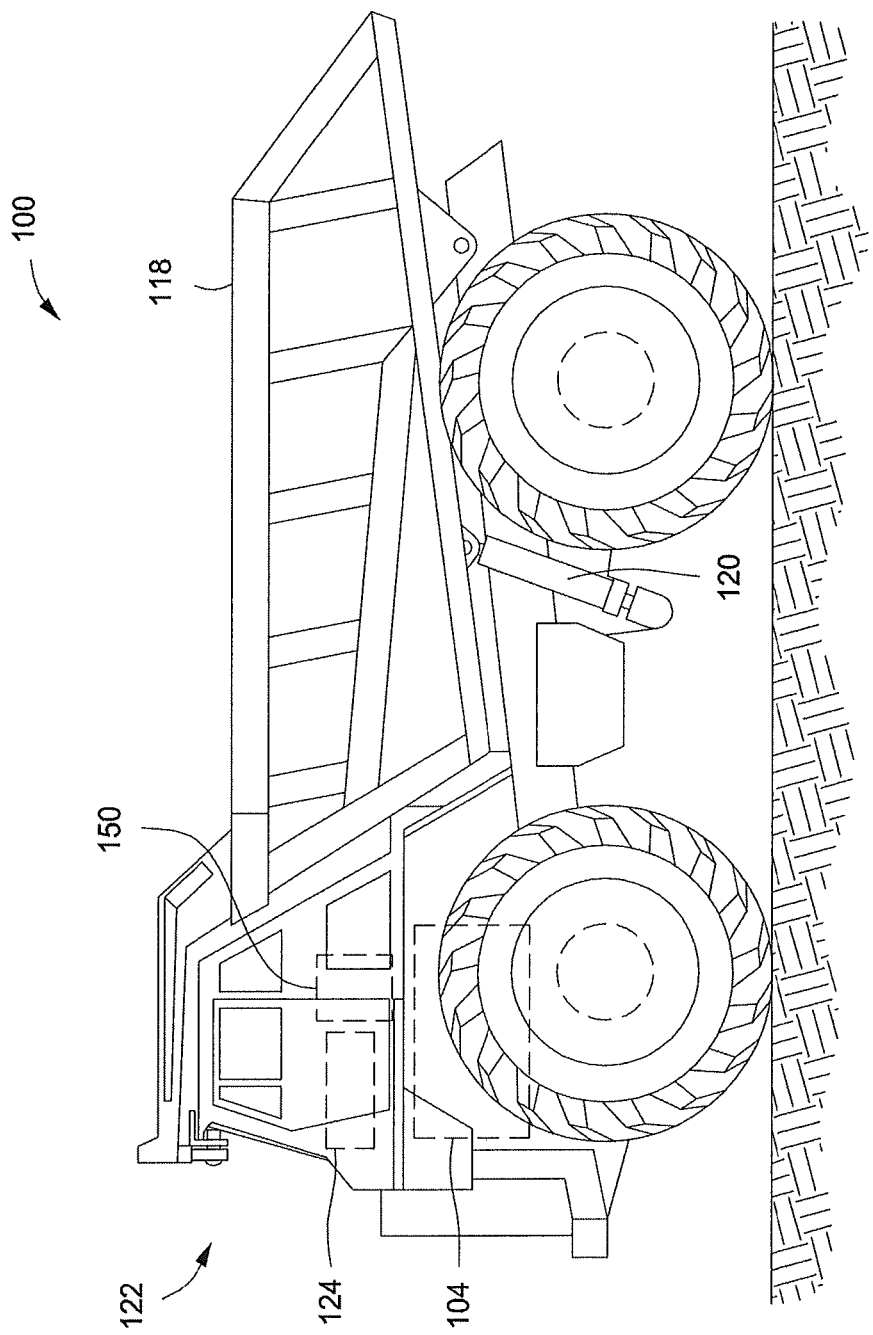
FIG. 1 shows a side view of a machine, according to an aspect of the disclosure.

FIG. 1 shows a side view of a machine 100, according to an aspect of the disclosure. The machine 100 is powered by an internal combustion (IC) engine 104. The IC engine 104 may be a reciprocating internal combustion engine, such as a compression ignition engine or a spark ignition engine, for example, or a rotating internal combustion engine, such as a gas turbine, for example.

The machine 100 may also include a work implement 118 driven by an actuator 120. The work implement 118 could be a dump bed, a shovel, a drill, a fork lift, a feller buncher, a conveyor, or any other implement known in the art for performing work on a load. The actuator 120 may be a hydraulic actuator, such as a linear hydraulic actuator or a hydraulic motor, an electric motor, a pneumatic actuator, or any other actuator known in the art.

The machine may include a cab 122 configured to accommodate an operator, and have a user interface 124 including input devices for asserting control over the machine 100. The user interface 124 may include pedals, wheels, joysticks, buttons, touch screens, combinations thereof, or any other user input device known in the art. Alternatively or additionally, the user interface 124 may include provisions for receiving control inputs remotely from the cab 122, including wired or wireless telemetry, for example.

The machine 100 includes a controller 150 operatively coupled to the user interface 124 for effecting control actions based at least in part on inputs from the user interface 124. It will be appreciated that the controller 150 may also effect either open-loop or closed-loop control actions based on inputs from sensors, operating maps stored therein, combinations thereof, or any other control inputs known in the art.

The machine 100 can be an "over-the-road" vehicle such as a truck used in transportation or may be any other type of machine that performs some type of operation associated with an industry such as mining, construction, farming, transportation, or any other industry known in the art. For example, the machine may be an off-highway truck, a railway locomotive, an earth-moving machine, such as a wheel loader, excavator, dump truck, backhoe, motor grader, material handler, or the like. The term "machine" can also refer to stationary equipment like a generator that is driven by an internal combustion engine to generate electricity. The specific machine 100 illustrated in FIG. 1 is a dump truck having a dump bed 118 actuated by a linear hydraulic cylinder 120.

Figure 2:
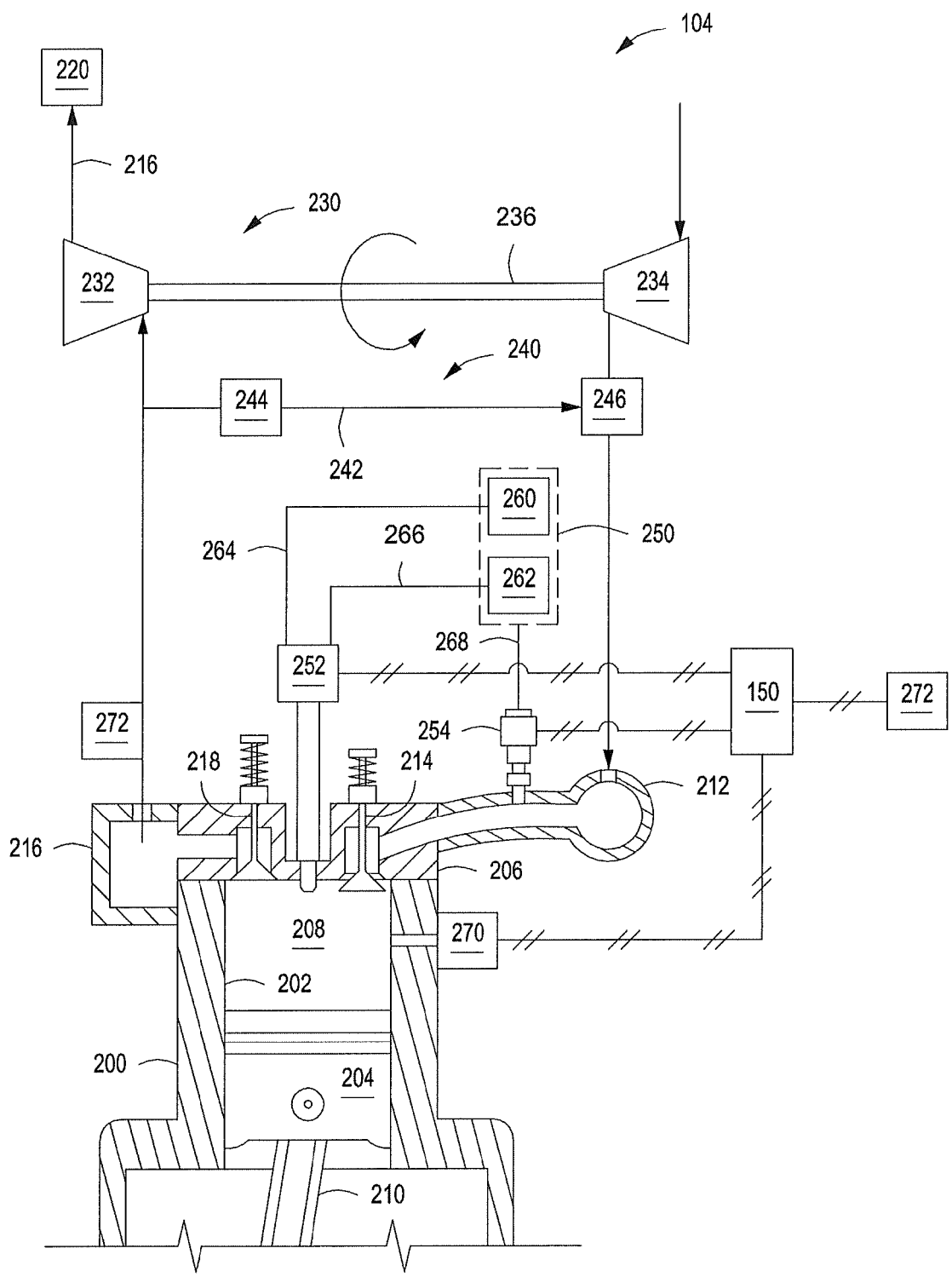
FIG. 2 shows a schematic view of an IC engine, according to an aspect of the disclosure.

FIG. 2 shows a schematic view of an IC engine 104, according to an aspect of the disclosure. The IC engine 104 includes a block 200 defining at least one cylinder bore 202 therein, at least one piston 204 disposed in sliding engagement with the cylinder bore 202, and a head 206 disposed on the block 200. The cylinder bore 202, the piston 204, and the head 206 define a combustion chamber 208. A volume of the combustion chamber 208 may vary with the location of the piston 204 relative to the head 206, such that the volume of the combustion chamber 208 is at a maximum when the piston 204 is located at Bottom Dead Center (BDC) of its stroke, and the volume of the combustion chamber 208 is at a minimum when the piston 204 is located at Top Dead Center (TDC) of its stroke.

The IC engine 104 may operate according to a four-stroke cycle, including an intake stroke (TDC to BDC), a compression stroke (BDC to TDC), an expansion stroke (TDC to BDC), and an exhaust stroke (BDC to TDC). Alternatively, the IC engine 104 may operate according to a two-stroke cycle, including a compression/exhaust stroke (BDC to TDC) and an expansion/exhaust/intake stroke (TDC to BDC).

The piston 204 is pivotally connected to a crankshaft (not shown) via a connecting rod 210 for transmitting mechanical power therebetween. Although only one piston 204 and cylinder bore 202 are shown in FIG. 2, it will be appreciated that the IC engine 104 may be configured to include any number of pistons and cylinder bores to suit a particular design or application.

The IC engine 104 receives a flow of oxidizer from an intake duct 212. One or more intake valves 214 effect selective fluid communication between the intake duct 212 and the combustion chamber 208. The IC engine 104 discharges a flow of exhaust to an exhaust duct 216. One or more exhaust valves 218 effect selective fluid communication between the combustion chamber 208 and the exhaust duct 216. The intake valves 214 and the exhaust valves 218 may be actuated by a cam/push-rod/rocker arm assembly (not shown), a solenoid actuator, a hydraulic actuator, or by any other cylinder valve actuator known in the art to open or close intake and exhaust valves.

The exhaust duct 216 may incorporate one or more exhaust aftertreatment modules 220 for trapping exhaust constituents, converting an exhaust constituent from one composition to another composition, or both. The one or more exhaust aftertreatment modules 220 may include a particulate filter, a nitrogen oxides (NOx) conversion module, an oxidation catalyst, combinations thereof, or any other exhaust aftertreatment device known in the art. According to an aspect of the disclosure, the IC engine 104 does not include a particulate filter.

According to an aspect of the disclosure, the IC engine 104 includes a turbocharger 230 having a turbine 232 operably coupled to a compressor 234 via a shaft 236. The turbine 232 receives a flow of exhaust gas via the exhaust duct 216 and extracts mechanical work from the exhaust gas by expansion of the exhaust gas therethrough. The mechanical work extracted from the turbine 232 from the flow of exhaust gas is transmitted to the compressor 234 via the shaft 236. The compressor 234 receives a flow of oxidizer, such as, for example, ambient air, and performs work on the flow of oxidizer by compression thereof. The flow of compressed oxidizer is discharged from the compressor 234 into the intake duct 212.

The IC engine 104 includes an Exhaust Gas Recirculation (EGR) system 240 for conveying exhaust gas into the flow of oxidizer to the IC engine 104. The EGR system 240 may include an EGR conduit 242 in fluid communication with the exhaust duct 216 upstream of the turbine 232, and in fluid communication with the intake duct 212 downstream of the compressor 234, effecting a so-called "high-pressure EGR loop." The EGR conduit 242 may incorporate an EGR conditioning module 244 that effects cooling, filtering, or throttling of exhaust gases flowing therethrough, combinations thereof, or any other exhaust gas processing known to benefit the operation of the EGR system 240. The EGR conduit 242 may couple with the intake duct 212 at a mixing device 246 configured to effect mixing between the recirculated exhaust gas and the flow of oxidizer.

The IC engine 104 receives combustible fuel from a fuel supply system 250. The fuel supply system 250 may include fuel storage, compressors, pumps, valves, regulators, instrumentation, or any other elements known in the art to be useful for supplying a flow of fuel. The IC engine 104 includes a direct fuel injector 252 disposed in direct fluid communication with the combustion chamber 208, a port fuel injector 254 disposed in the intake duct 212 upstream of the intake valve 214, combinations thereof, or any other fuel injector arrangement known in the art. The direct fuel injector 252 and the port fuel injector 254 may each be operatively coupled to the controller 150 for control thereof.

The fuel supply system 250 may include a first fuel supply 260, a second fuel supply 262, or both. The direct fuel injector 252 may be in fluid communication with the first fuel supply 260 via a first fuel conduit 264, the second fuel supply 262 via a second fuel conduit 266, or both. The port fuel injector may be in fluid communication with the second fuel supply 262 via a third fuel conduit 268.

According to an aspect of the disclosure, the first fuel supply 260 is a liquid fuel supply that delivers a liquid fuel to the combustion chamber 208. The liquid fuel may include distillate diesel, biodiesel, dimethyl ether, ethanol, methanol, seed oils, liquefied natural gas (LNG), liquefied petroleum gas (LPG), Fischer-Tropsch derived fuel, combinations thereof, or any other combustible liquid known in the art to have a sufficiently high octane value and a sufficiently low cetane value to enable compression ignition in a reciprocating IC engine. According to another aspect of the disclosure, the first fuel supply 260 is a distillate diesel fuel supply.

According to an aspect of the disclosure, the second fuel supply 262 is a gaseous fuel supply that delivers a gaseous fuel to the combustion chamber 208. The gaseous fuel may include natural gas, methane, propane, hydrogen, biogas, syngas, combinations thereof, or any other combustible gas known in the art. According to another aspect of the disclosure, the gaseous fuel is natural gas. According to yet another aspect of the disclosure, the gaseous fuel is a combustible gas comprising at least 50% methane by mole.

The direct fuel injector 252 is configured to effect selective fluid communication between the fuel supply system 250 and the combustion chamber 208. For example, the direct fuel injector 252 may assume any one of the following four fluid configurations. According to a first configuration, the direct fuel injector 252 blocks fluid communication between both the first fuel supply 260 and the second fuel supply 262, and the combustion chamber 208. According to a second configuration, the direct fuel injector 252 blocks fluid communication between the first fuel supply 260 and the combustion chamber 208 and effects fluid communication between the second fuel supply 262 and the combustion chamber 208. According to a third configuration, the direct fuel injector 252 effects fluid communication between the first fuel supply 260 and the combustion chamber 208 and blocks fluid communication between the second fuel supply 262 and the combustion chamber 208. According to a fourth configuration, the direct fuel injector 252 effects fluid communication between both the first fuel supply 260 and the second fuel supply, and the combustion chamber 208.

The direct fuel injector 252 may include an actuator configured to change the fluid configuration of the direct fuel injector 252 under the control of the controller 150. The actuator for the direct fuel injector 252 may include a solenoid actuator, a hydraulic actuator, a pneumatic actuator, a mechanical actuator, such as, for example a cam actuator, combinations thereof, or any other fuel injector actuator known in the art.

Similarly, the port fuel injector 254 is configured to effect selective fluid communication between the fuel supply system 250 and the combustion chamber 208. For example, the port fuel injector 254 may assume one of the following two fluid configurations. According to a first configuration, the port fuel injector 254 blocks fluid communication between the second fuel supply 262 and the intake duct 212. According to a second configuration, the port fuel injector 254 effects fluid communication between the second fuel supply 262 and the intake duct.

The port fuel injector 254 may include an actuator configured to change the fluid configuration of the port fuel injector 254 under the control of the controller 150. The actuator for the port fuel injector 254 may include a solenoid actuator, a hydraulic actuator, a pneumatic actuator, a mechanical actuator, such as, for example a cam actuator, combinations thereof, or any other fuel injector actuator known in the art.

Figure 3:
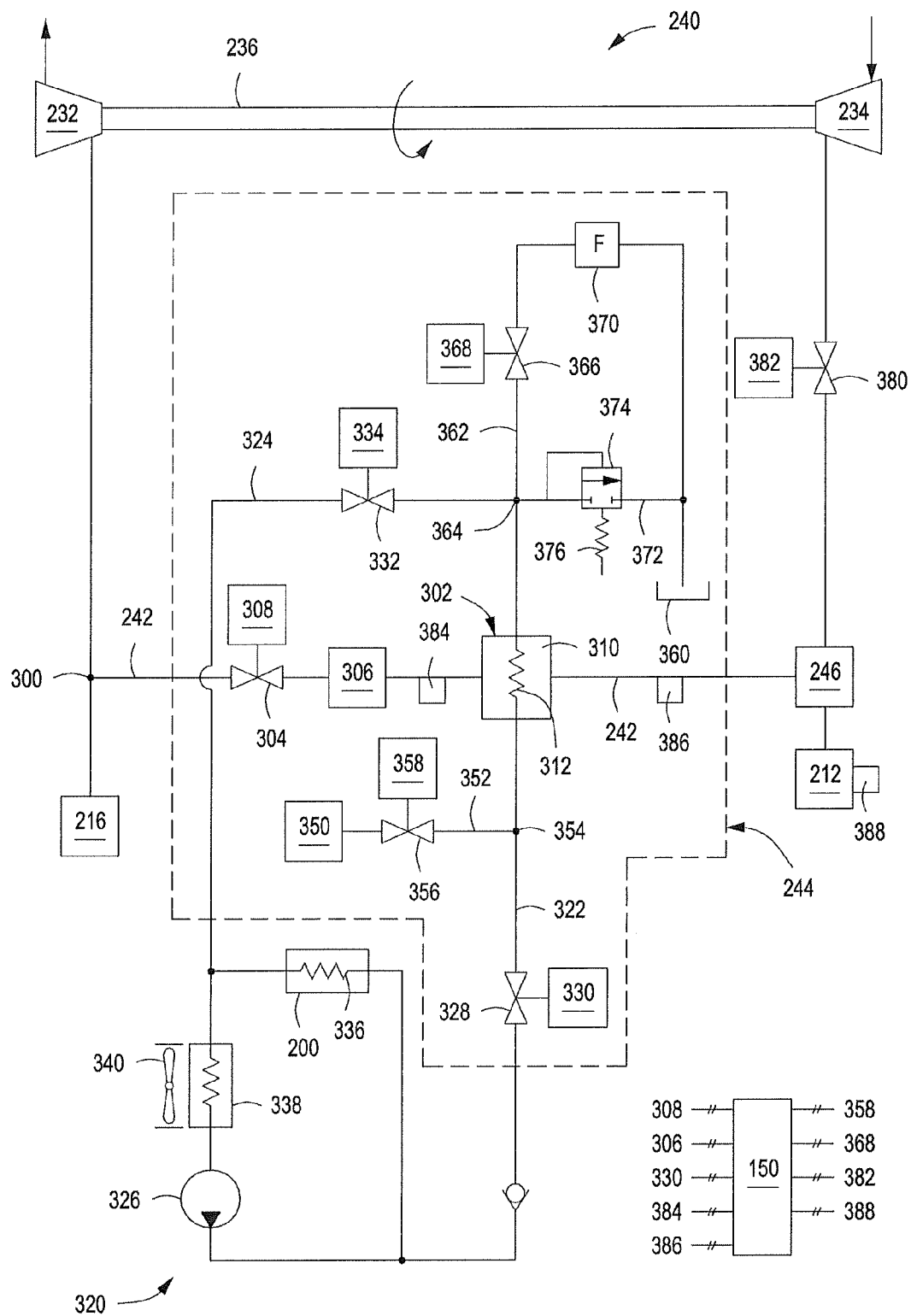
FIG. 3 shows a schematic view of an EGR conditioning module, according to an aspect of the disclosure.

FIG. 3 shows an EGR system 240, according to an aspect of the disclosure. The EGR system 240 includes an EGR conditioning module 244 in fluid communication with the exhaust duct 216 at a point 300, which is upstream of the turbine 232, and in fluid communication with the intake duct 212 at a mixing device 246, which is downstream of the compressor 234. According to an aspect of the disclosure, the mixing device 246 consists of a portion of the intake duct 212.

The EGR conduit 242 includes an EGR heat exchanger 302, and may include an EGR control valve 304 and/or a flowmeter 306. The EGR control valve 304 may selectively effect or block fluid communication between the exhaust duct 216 and the intake duct 212 via the EGR conduit 242. Further, the EGR control valve 304 may also selectively throttle a flow of exhaust gas from the exhaust duct 216 to the intake duct 212. The EGR control valve 304 may be operatively coupled to an actuator 308, which is in turn operatively coupled to the controller 150, such that the controller 150 may adjust an effective flow area through the EGR control valve 304. It will be appreciated that the controller 150 may direct the EGR control valve 304 to assume a closed position, assume a wide open position, or effect flow area between the closed position and the wide open position.

The flowmeter 506 is configured to measure a flow rate of EGR through the EGR conduit 242. The flowmeter 306 may include a calibrated orifice such as an orifice plate or a venturi, a pressure drop transducer, a turbine, a turbine rotation sensor, a virtual sensor based on conservation of mass and/or energy across the mixing device 246, combinations thereof, or any other flow meter known in the art for measuring a flow of exhaust gas. The flowmeter 306 may be operatively coupled to the controller 150, such that the controller 150 may receive a signal indicative of exhaust gas flow through the EGR conduit 242, and perform control actions based thereon.

The EGR heat exchanger 302 includes an exhaust flowpath 310 and a heat transfer medium flowpath 312. The exhaust flowpath 310 may be in thermal communication with the heat transfer medium flowpath 312 via a heat transfer wall. However, the exhaust flowpath 310 may be blocked from fluid communication with the heat transfer medium flowpath 312 within the EGR heat exchanger 302. The exhaust flowpath 310 of the EGR heat exchanger 302 is in fluid communication with both the exhaust duct 216 and the intake duct 212 via the EGR conduit 242. It will be appreciated that the heat transfer medium flowpath 312 may be defined by a tube-side of the EGR heat exchanger 302, and the exhaust flowpath 310 may be defined by a shell-side of the EGR heat exchanger 302, or vice versa.

The heat transfer medium flowpath 312 of the EGR heat exchanger 302 is in fluid communication with a heat transfer medium source 320 via a supply conduit 322 and a return conduit 324. The heat transfer medium source 320 may include a pump 326 for pressurizing a heat transfer medium contained therein. The EGR conditioning module 244 further includes a supply valve 328 configured to effect selective fluid communication between the EGR heat exchanger 302 and the heat transfer medium source 320 via the supply conduit 322. The supply valve 328 may be operatively coupled to an actuator 330, which is in turn operatively coupled to the controller 150, such that the controller 150 may adjust an effective flow area through the supply valve 328. It will be appreciated that the controller 150 may direct the supply valve 328 to assume a closed position, assume a wide open position, or effect flow area between the closed position and the wide open position.

The EGR conditioning module 244 further includes a return valve 332 configured to effect selective fluid communication between the EGR heat exchanger 302 and the heat transfer medium source 320 via the return conduit 324. The return valve 332 may be operatively coupled to an actuator 334, which is in turn operatively coupled to the controller 150, such that the controller 150 may adjust an effective flow area through the return valve 332. It will be appreciated that the controller 150 may direct the return valve 332 to assume a closed position, assume a wide open position, or effect flow area between the closed position and the wide open position.

According to an aspect of the disclosure, the heat transfer medium source 320 may be a coolant circuit of the IC engine 104. Accordingly, the pump 326 may also supply the heat transfer medium through cooling passages 336 of the block 200, for example, and may draw the heat transfer medium from a heat exchanger 338. The heat exchanger 338 may be configured to cool the heat transfer medium flowing therethrough by exchanging heat with ambient air surrounding the engine 104 driven through the heat exchanger 338 by a fan 340. However, it will be appreciated that other fluid circuits may be used to supply a heat transfer medium to the EGR heat exchanger 302. The heat transfer medium may include water, ethylene glycol, combinations thereof, or any other heat transfer medium known in the art. According to an aspect of the disclosure, the heat transfer medium is in a liquid state exiting the pump 326.

The supply conduit 322 may be in fluid communication with a purge fluid supply 350 via a purge fluid conduit 352. The purge fluid conduit 352 joins the supply conduit 322 at a point 354 downstream of the supply valve 328 and upstream of the EGR heat exchanger 302. The purge fluid conduit 352 includes an upstream purge valve 356 configured to effect selective fluid communication between the purge fluid supply 350 and the supply conduit 322. The purge fluid supplied by the purge fluid supply 350 may include air, nitrogen, combinations thereof, or any other purge fluid known in the art. According to an aspect of the disclosure, the purge fluid is a gas. According to another aspect of the disclosure, the purge fluid is provided from the outlet of the compressor 234.

The upstream purge valve 356 may be operatively coupled to an actuator 358, which is in turn operatively coupled to the controller 150, such that the controller 150 may adjust an effective flow area through the upstream purge valve 356. It will be appreciated that the controller 150 may direct the upstream purge valve 356 to assume a closed position, assume a wide open position, or effect flow area between the closed position and the wide open position.

The heat transfer medium flowpath 312 of the EGR heat exchanger 302 may be in fluid communication with a reservoir 360 via a purge conduit 362. The purge conduit 362 joins the return conduit 324 at a point 364 downstream of the EGR heat exchanger 302. The purge conduit 362 includes a downstream purge valve 366 configured to effect selective fluid communication between the heat transfer medium flowpath 312 and the reservoir 360. The downstream purge valve 366 may be operatively coupled to an actuator 368, which is in turn operatively coupled to the controller 150, such that the controller 150 may adjust an effective flow area through the downstream purge valve 366. It will be appreciated that the controller 150 may direct the downstream purge valve 366 to assume a closed position, assume a wide open position, or effect flow area between the closed position and the wide open position. The purge conduit 362 may optionally include a filter 370.

The purged heat transfer medium may reside in the reservoir 360, or it may be directed back to the heat transfer medium source 320 according to conventional methods. Further, the reservoir 360 may be open to the ambient environment of the engine 104 and act as a separator to separate the purged heat transfer medium from the purge fluid by venting the purge fluid to the ambient environment.

The heat transfer medium flowpath 312 of the EGR heat exchanger 302 may also be in fluid communication with the reservoir 360 via a relief conduit 372 including a relief valve 374. The relief valve 374 is configured to effect fluid communication between the heat transfer medium flowpath 312 and the reservoir 360 when a pressure in the relief conduit 372 upstream of the relief valve 374 exceeds a preset pressure value. According to an aspect of the disclosure, the preset pressure value may be determined by a resilient member 376 of the relief valve 374.

The intake duct 212 may include a throttle valve 380 configured to throttle a flow of oxidizer from the compressor 234 upstream of the mixing device 246. The throttle valve 380 may be operatively coupled to an actuator 382, which is in turn operatively coupled to the controller 150, such that the controller 150 may adjust an effective flow area through the throttle valve 380. It will be appreciated that the controller 150 may direct the throttle valve 380 to assume a wide open position or effect flow area less than the wide open position. According to an aspect of the disclosure, a minimum flow area of the throttle valve 380 is greater than zero, such that the minimum flow area of the throttle valve 380 does not completely block fluid communication between the compressor 234 and the mixing device 246.

The EGR conditioning module 244 may include an upstream exhaust temperature sensor 384 and a downstream exhaust temperature sensor 386. The upstream exhaust temperature sensor 384 is configured to sense a temperature of exhaust flow entering the exhaust flowpath 310 of the heat exchanger 302, and may transmit a signal to the controller 150 that is indicative of the temperature so measured. The downstream exhaust temperature sensor 386 is configured to sense a temperature of exhaust flow exiting the exhaust flowpath 310 of the heat exchanger 302, and may transmit a signal to the controller 150 that is indicative of the temperature so measured.

The EGR system 240 may include a intake duct sensor 388, which senses a temperature of the oxidizer flow downstream of the mixing device 246, a pressure of the oxidizer flow downstream of the mixing device 246, an oxygen concentration of the oxidizer flow downstream of the mixing device 246, combinations thereof, or any other attribute of the oxidizer flow downstream of the mixing device 246 known in the art to be beneficial to control of the EGR system 240. The intake duct sensor 388 may be operably coupled to the controller 150, such that the intake duct sensor 388 may transmit one or more signals to the controller 150 indicative of a state of the oxidizer flow downstream of the mixing device 246. According to an aspect of the disclosure, the intake duct sensor 388 is located at least partly within an intake manifold of the engine 104.

INDUSTRIAL APPLICABILITY

The present disclosure is generally applicable to exhaust gas recirculation systems for internal combustion engines and methods of operating the same.

Referring to FIG. 2, the controller 150 is configured to operate the IC engine 104 in different operating modes. According to an aspect of the disclosure, the controller 150 is configured to operate the IC engine 104 in a substantially premixed combustion mode or a substantially non-premixed combustion mode. Non-limiting examples of substantially premixed modes of operation include homogeneous charge compression ignition (HCCI) and piloted-HCCI. A non-limiting example of a non-premixed combustion mode is conventional direct-injection compression ignition.

The conventional direct-injection compression ignition mode is characterized by most, if not all, of the fuel being injected relatively late in the compression stroke, when the temperature and pressure in the combustion chamber are sufficient to autoignite mixtures of the fuel and oxidizer. The autoignition delay times are relatively short, and in turn, the start of combustion is largely determined by the fuel injection timing. According to an aspect of the disclosure, the conventional compression ignition mode is a diesel operating mode.

As a result of the short residence time of the fuel and oxidizer between the fuel injection and the start of combustion, the combustion process may proceed in a largely mixing-limited fashion, resulting in propagation of a substantially non-premixed or diffusion-type flame through the fuel-oxidizer mixture in the combustion chamber. In turn, much of the fuel may burn at a near-stoichiometric mixture at a boundary between fuel rich regions and adjacent oxidizer, resulting in high flame temperatures and relatively rapid formation of nitrogen oxides (NOx) and particulate matter. According to an aspect of the disclosure for the conventional compression ignition mode, most, if not all, of the fuel is injected between about 30 degrees before TDC of the compression stroke and about 20 degrees after TDC of the compression stroke.

Figure 4:
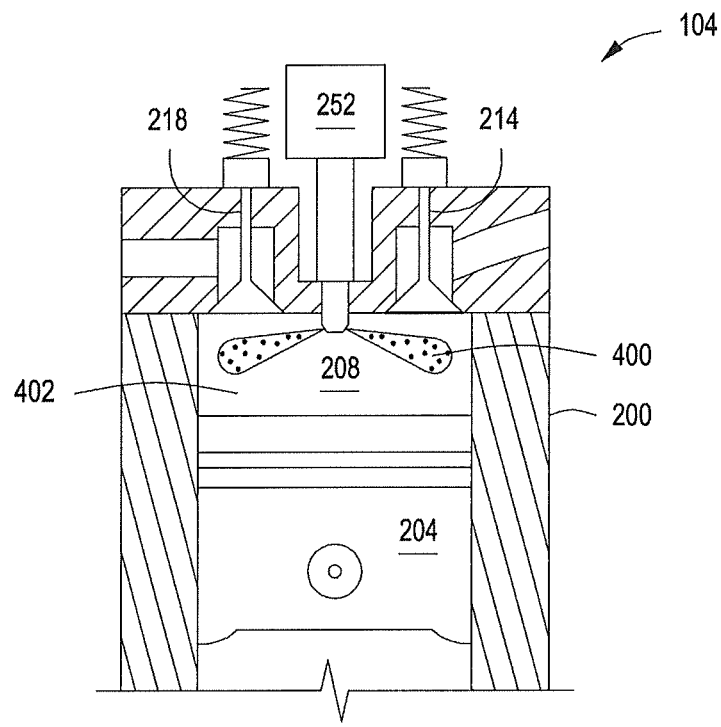
FIG. 4 shows a schematic cross sectional view of an IC engine operating in a conventional compression ignition mode, according to an aspect of the disclosure.

For example, FIG. 4 shows a schematic cross sectional view of an IC engine 104 operating in a conventional compression ignition mode, according to an aspect of the disclosure. In FIG. 4, the piston 204 is near TDC of the compression stroke, which may include piston locations before or after TDC of the compression stroke, pressure and temperature in the combustion chamber 208 are sufficient to effect autoignition, and the exhaust valve 218 and intake valve 214 are in closed positions. The direct fuel injector 252 injects a portion of high octane and/or low cetane fuel 400 into a mass of compressed oxidizer 402. After an ignition delay time, corresponding to factors including pressure and temperature in the combustion chamber 208, chemical composition of the oxidizer, and chemical composition of the injected fuel 400, the portion of fuel 400 burns in the mass of compressed oxidizer 402 in a largely mixing-limited fashion.

The HCCI mode is characterized by most, if not all, of the fuel being injected relatively early in the compression stroke, or even during the preceding intake stroke, when the temperature and pressure in the combustion chamber are insufficient to autoignite mixtures of the fuel and oxidizer. Accordingly, the fuel and oxidizer enjoy a relatively long time duration, and charge motion caused by the motion of the piston in the cylinder bore, to thoroughly evaporate and form a lean, substantially homogeneous mixture of fuel and oxidizer. According to an aspect of the disclosure, a lean and substantially homogeneous mixture of fuel and oxidizer is devoid of mixture portions having a rich stoichiometry at the start of combustion.

The start of combustion during the HCCI mode is then determined by when the temperature and pressure in the combustion chamber reach conditions sufficient to support autoignition of the lean fuel-oxidizer mixture. As a result of the premixed nature of the fuel and oxidizer and the autoignition conditions present at the start of combustion, the combustion process proceeds rapidly over the volume of the combustion chamber with little or no discernable flame propagation. In turn, much if not all of the fuel burns at a lean equivalence ratio, which results in low flame temperatures and slow formation of NOx and particulates. According to an aspect of the disclosure for the HCCI mode, most, if not all, of the fuel is introduced into the combustion chamber before about 30 degrees before TDC. During the HCCI mode fuel may be introduced into the combustion chamber 208 via the direct fuel injector 252, the port fuel injector 254, or combinations thereof.

Figure 5:
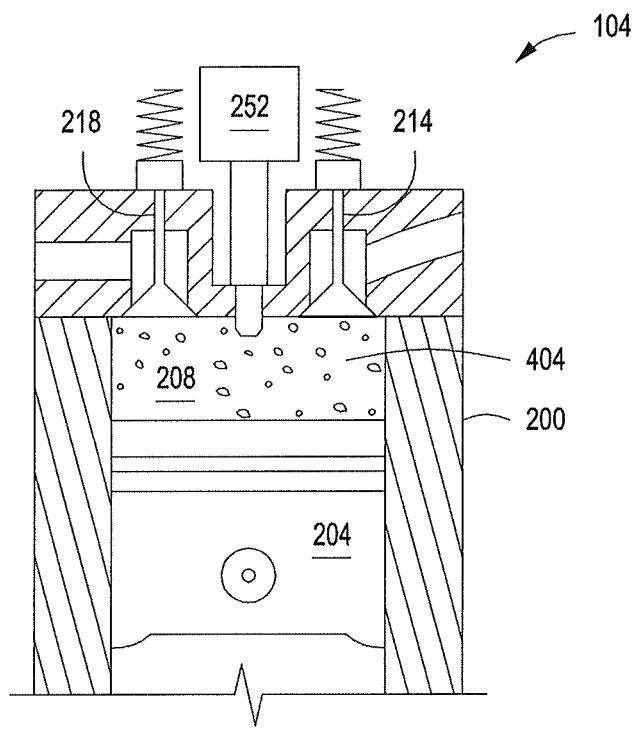
FIG. 5 shows a schematic cross sectional view of an IC engine operating in an HCCI mode, according to an aspect of the disclosure.

For example, FIG. 5 shows a schematic cross sectional view of an IC engine 104 operating in an HCCI mode, according to an aspect of the disclosure. In FIG. 5, the piston 204 is before TDC of the compression stroke, pressure and temperature in the combustion chamber 208 are still insufficient to effect autoignition of a lean fuel-oxidizer mixture, and the exhaust valve 218 and intake valve 214 are in closed positions. Prior to the timing shown in FIG. 6, a portion of fuel was introduced into the combustion chamber 208 by the direct fuel injector 252, the port fuel injector 254, or both, and the portion of fuel mixed with an oxidizer to form a nearly homogeneous fuel-oxidizer mixture 404 in the combustion chamber 208. The mixture 404 ignites after further compression, thereby increasing both the pressure and temperature of the mixture 404, and the mixture 404 burns in a largely premixed mode.

It will be appreciated that the stoichiometry of the fuel-oxidizer mixture 404 may be varied with factors including, but not limited to, the load of the IC engine 104 across a plurality of discreet and preselected HCCI operating conditions.

The piloted-HCCI mode is characterized by most of the fuel being injected relatively early in the compression stroke, similar to the HCCI mode, but then ignition timing is largely determined by a later and relatively smaller pilot injection of fuel near TDC of the compression stroke. Although the pressure and temperature in the combustion chamber may not be sufficient to autoignite the lean homogeneous mixture of fuel and oxidizer, the richer pilot injection autoignites after a short ignition delay time, thereby providing an ignition source to propagate a flame through the lean premixture of fuel and oxidizer. In turn, most of the fuel burns at a lean equivalence ratio, and therefore a low flame temperature and corresponding low formation rates of NOx and particulate matter, while the pilot injection improves control over the start of combustion. Alternatively or additional to the pilot fuel injection, a the IC engine 104 may include a spark igniter (not shown) configured to ignite the lean homogeneous mixture of fuel and oxidizer by transmitting an electric spark through at least a portion of the lean fuel-oxidizer mixture.

According to an aspect of the disclosure for the piloted-HCCI mode, most of the fuel is introduced into the combustion chamber before about 30 degrees before TDC. According to another aspect of the disclosure for the piloted-HCCI mode, over 90% of the fuel, by heating value, is introduced into the combustion chamber before about 30 degrees before TDC, and less than about 10% of the remaining fuel is injected via a direct pilot injection after about 30 degrees before TDC. According to another aspect of the disclosure, the direct pilot injection contributes between about 4 to 7 percent of the total heat released in the combustion chamber. During the piloted-HCCI mode, most of the fuel may be introduced into the combustion chamber 208 via the direct fuel injector 252, the port fuel injector 254, or combinations thereof.

Figure 6:
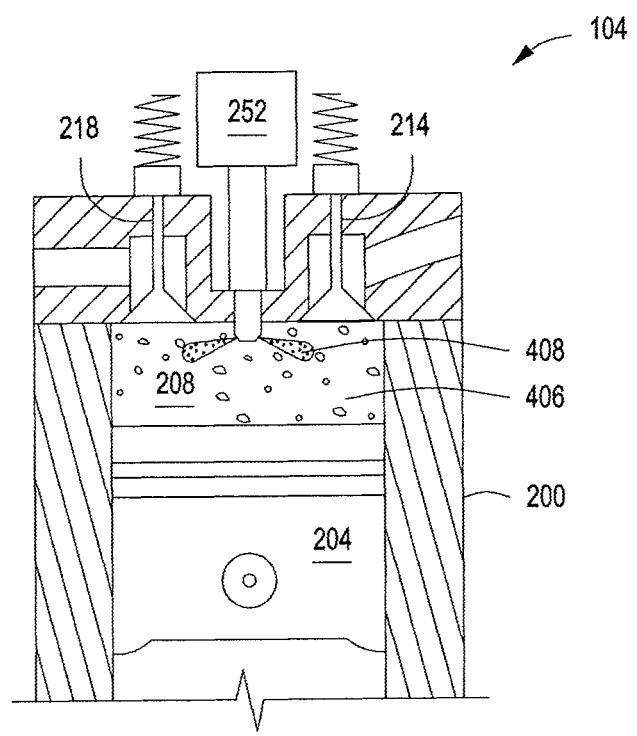
FIG. 6 shows a schematic cross sectional view of an IC engine operating in a piloted-HCCI mode, according to an aspect of the disclosure.

For example, FIG. 6 shows a schematic cross sectional view of an IC engine 104 operating in a piloted-HCCI mode, according to an aspect of the disclosure. In FIG. 6, the piston 204 is near TDC of the compression stroke, which may include piston locations before or after TDC of the compression stroke; pressure and temperature in the combustion chamber 208 are still insufficient to effect autoignition of a lean fuel-oxidizer mixture; and the exhaust valve 218 and intake valve 214 are in closed positions. Prior to the timing shown in FIG. 6, a portion of fuel was introduced into the combustion chamber 208 by the direct fuel injector 252, the port fuel injector 254, or both, and the portion of fuel mixed with an oxidizer to form a nearly homogeneous lean fuel-oxidizer mixture 406 in the combustion chamber 208. A second portion of fuel having a relatively high octane number and/or low cetane number 408 is injected into the combustion chamber 208 as a pilot fuel injection. Although the pressure and temperature in the combustion chamber 208 are insufficient to effect autoignition of the fuel-oxidizer mixture 406, conditions are sufficient to effect autoignition of the second portion of fuel 408 near the richer boundary with the lean fuel-oxidizer mixture 406. In turn, the second portion of fuel 408 proceeds to burn in a largely mixing-limited combustion mode, which acts as an ignition source to ignite the fuel-oxidizer mixture 406 in a largely premixed combustion mode.

During the HCCI mode, most, if not all of the fuel may be gaseous fuel from the second fuel supply 262. During the piloted-HCCI mode, most of the fuel may be gaseous fuel from the second fuel supply 262, while the pilot injection is a high octane and/or low cetane fuel supplied by the first fuel supply 260.

The temperature of the oxidizer entering the engine through the intake duct 212 is an important control parameter for both substantially premixed and substantially non-premixed operation of the IC engine 104. This oxidizer temperature may be referred to as an intake manifold temperature (IMAT). When operating in a substantially non-premixed combustion mode, NOx emissions scale with peak in-cylinder temperatures, which in turn scale with IMAT. Accordingly, when operating in a substantially non-premixed combustion mode, an operator may wish to minimize IMAT or target a relatively low value of IMAT.

When operating in a substantially premixed combustion mode, NOx emissions are not as sensitive to IMAT as in non-premixed combustion operation because the premixed nature of the combustion process tends to result in lower peak in-cylinder temperatures. However, operators may target relatively higher values of IMAT for substantially premixed combustion to promote combustion stability and to reduce UHC emissions. Accordingly, an oxidizer intake system for an IC engine 104 that operates in dual combustion modes may be subject to demanding performance specifications in order to produce relatively low values of IMAT during substantially non-premixed operation and to produce relatively high values of IMAT during substantially premixed operation.

IMAT depends at least in part on the temperature of ambient air surrounding the IC engine 104, turbocharger 230 performance, EGR fraction in the oxidizer flow, and EGR flow temperature. The temperature of the EGR flow exiting the EGR conduit 242 can have a particularly strong influence on IMAT at high values of EGR fraction. For example, target EGR fractions for non-premixed operation may exceed 25% by volume, and target EGR fractions for premixed operation may approach 70% by volume. Accordingly, performance of the IC engine 104 may be sensitive to EGR temperature exiting the EGR conduit 242.

Referring to FIG. 3, the EGR conditioning module 244 may operate in either a cooling mode or an uncooled mode. During cooling mode operation of the EGR conditioning module 244, the supply valve 328 and the return valve 332 are both actuated to open positions to deliver a flow of a heat transfer medium to the EGR heat exchanger 302, thereby cooling a flow of EGR therethrough by a transfer of heat from the EGR flow into the heat transfer medium. Further according to the cooling mode of the EGR conditioning module, the upstream purge valve 356 and the downstream purge valve 366 are both actuated to closed positions to isolate the heat transfer medium flowpath 312 of the EGR heat exchanger 302 from fluid communication with the purge fluid supply 350 and the reservoir 360 via the purge conduit 362.

It will be appreciated that the amount of heat transfer between the EGR flow and the heat transfer medium within the EGR heat exchanger 302 may be controlled by varying the flow of heat transfer medium through the EGR heat exchanger 302. The flow of heat transfer medium through the EGR heat exchanger may be varied by proportionally varying a flow area of the supply valve 328, the return valve 332, or combinations thereof, for example. However, reducing the flow of heat transfer medium through the EGR heat exchanger 302 too far may result in boiling of the heat transfer medium, which may result in excessive pressures within the heat transfer medium flowpath 312, buildup of deposits and scale within the heat transfer medium flowpath 312, or combinations thereof. Furthermore, some engine operating conditions may benefit from not cooling the EGR flow through the EGR conduit 242 at all. Accordingly, the EGR conditioning module 244 may be operated in an uncooled mode that addresses the above-noted challenges.

During operation of the EGR conditioning module 244 in the uncooled mode, the supply valve 328 and the return valve 332 are actuated to closed positions to block fluid communication between medium flowpath 312 of the EGR heat exchanger 302 and the heat transfer medium source 320. Further according to the uncooled mode of the EGR conditioning module 244, the upstream purge valve 356 and the downstream purge valve 366 are both actuated, at least temporarily, to an open position, thereby purging the heat transfer medium from the heat transfer medium flowpath 312. Once purged of the heat transfer medium, the EGR conditioning module 244 may maintain uncooled operation by further actuating the upstream purge valve 356 and the downstream purge valve 366 to closed positions to seal the purge fluid within the heat transfer medium flowpath 312 of the EGR heat exchanger 302. Alternatively, the EGR conditioning module 244 may continue to deliver a bleed flow of purge fluid through the EGR heat exchanger during uncooled operation by throttling the upstream purge valve 356 the downstream purge valve 366, or both.

Purging the heat transfer medium from the EGR heat exchanger 302 for the uncooled mode of operation offers the benefits of avoiding boiling of the heat transfer medium within the heat exchanger 302 as well as increasing a thermal resistance to heat loss from the EGR flow into the heat transfer medium flowpath 312. According to an aspect of the disclosure, the heat transfer medium is a liquid with a high thermal conductivity and high heat capacity and the purge fluid is a gas with a thermal conductivity and heat capacity less than that of the heat transfer medium. Accordingly, the purge fluid poses a higher thermal resistance to heat transfer out of the EGR flow compared to filling the heat transfer medium flowpath with the heat transfer medium, thereby enabling higher IMAT values.

The controller 150 may be configured to refill the heat transfer medium flowpath 312 with heat transfer medium upon a transition from the uncooled mode to a cooling mode of the EGR conditioning module 244. The refilling procedure includes opening the downstream purge valve 366 and opening the supply valve 328, while holding the return valve 332 and the upstream purge valve 356 in closed positions, thereby venting the purge fluid from the heat transfer medium flowpath 312 of the heat exchanger 302 to the reservoir 360, and replacing the purge fluid in the heat transfer medium flowpath 312 with heat transfer medium fluid from the heat transfer medium source 320.

According to an aspect of the disclosure, the controller 150 configures the EGR conditioning module 244 to operate in the cooling mode while the engine 104 is operating in a substantially non-premixed combustion mode to reduce IMAT values. According to another aspect of the disclosure, the controller 150 configures the EGR conditioning module 244 to operate in the uncooled mode while the engine 104 is operating in a substantially premixed combustion mode to increase IMAT values. It will be appreciated that the controller 150 may proactively or retroactively reconfigure the EGR conditioning module from the cooling mode to the uncooled mode upon changing from a substantially non-premixed combustion mode of the engine 104 to a substantially premixed combustion mode of the engine 104, or vice versa.

The controller 150 may hold the throttle valve 380 in a wide open position while the pressure difference across the EGR conduit 242 is sufficient to drive the target amount of EGR flow. For example, the throttle valve 380 may be held in the wide open position while the engine 104 operates in a conventional direct-injection compression ignition mode or a piloted-HCCI mode. Further, the controller 150 may proportionally decrease a flow area of the throttle valve 380 to decrease a pressure at the exit of the EGR conduit 242, thereby increasing the potential to drive a higher fraction of EGR in the final oxidizer composition. For example, the throttle valve 380 may be adjusted to decrease its flow area below a wide open flow area when the engine 104 operates in an HCCI mode. Accordingly, the controller may actuate the EGR control valve 304 and the throttle valve 380 to achieve target EGR fractions according to calibration maps, or the like, across the entire operating range of the engine 104.

It will be appreciated that any of the methods or functions described herein may be performed by or controlled by the controller 150. Further, any of the methods or functions described herein may be embodied in a computer-readable non-transitory medium for causing the controller 150 to perform the methods or functions described herein. Such computer-readable non-transitory media may include magnetic disks, optical discs, solid state disk drives, combinations thereof, or any other computer-readable non-transitory medium known in the art. Moreover, it will be appreciated that the methods and functions described herein may be incorporated into larger control schemes for an engine, a hybrid powertrain, a machine, or combinations thereof, including other methods and functions not described herein.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Unless specified otherwise, use of the word "substantially" herein is intended to mean "considerable in extent," or "largely but not necessarily wholly that which is specified."

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. An exhaust gas recirculation (EGR) system for an internal combustion engine, comprising:
    an EGR duct configured to effect fluid communication between an exhaust duct and an intake duct of the internal combustion engine;
    a heat exchanger having a first flow passage and a second flow passage, the first flow passage being in fluid communication with the EGR duct, the second flow passage being configured to receive a heat transfer medium from a heat transfer medium source;
    an upstream purge valve in fluid communication with the second flow passage of the heat exchanger, and configured to effect selective fluid communication between a purge fluid source and the second flow passage of the heat exchanger, the purge fluid source being distinct from the heat transfer medium source; and
    a controller operatively coupled to the upstream purge valve, the controller being configured to purge the second flow passage of the heat exchanger at least in part by opening the upstream purge valve.

2. The system of claim 1, further comprising a downstream purge valve in fluid communication with the upstream purge valve via the second flow passage of the heat exchanger, wherein the controller is further configured to open the downstream purge valve while the upstream purge valve is open.

3. The EGR system of claim 2, further comprising a supply valve in fluid communication with the second flow passage of the heat exchanger, the supply valve being configured to effect selective fluid communication between the heat transfer medium source and the second flow passage of the heat exchanger,
    wherein the controller is further configured to close the supply valve while the upstream purge valve is open.

4. The EGR system of claim 3, further comprising a return valve in fluid communication with the supply valve via the second flow passage of the heat exchanger,
    wherein the controller is further configured to close the return valve while the upstream purge valve is open.

5. The EGR system of claim 1, further comprising a supply valve in fluid communication with the second flow passage of the heat exchanger, the supply valve being configured to effect selective fluid communication between the heat transfer medium source and the second flow passage of the heat exchanger,
  wherein the controller is further configure to circulate the heat transfer medium through the second flow passage of the heat exchanger at least in part by
    opening the supply valve, and
      closing the upstream purge valve while the supply valve is open.

6. The EGR system of claim 5, further comprising:
  a downstream purge valve in fluid communication with the upstream purge valve via the second flow passage of the heat exchanger; and
  a return valve in fluid communication with the supply valve via the second flow passage of the heat exchanger,
  wherein the controller is further configured to open the return valve and close the downstream purge valve while the supply valve is open.

7. A method for operating an exhaust gas recirculation (EGR) system of an internal combustion engine, the EGR system including
  an EGR duct in fluid communication with an exhaust duct and an intake duct of the internal combustion engine, and
  a heat exchanger having a first flow passage and a second flow passage, the first flow passage being in fluid communication with the EGR duct, the second flow passage being in fluid communication with a heat transfer medium source,
  the method comprising:
    purging a heat transfer medium out of the second flow passage of the heat exchanger using a purge fluid, the heat transfer medium being distinct from the purge fluid.

8. The method of claim 7, further comprising circulating the heat transfer medium through the second flow passage of the heat exchanger.

9. The method of claim 7, further comprising operating the internal combustion engine in a substantially premixed mode while the second flow passage of the heat exchanger is purged by purge fluid.

10. The method of claim 9, further comprising operating the internal combustion engine in a substantially non-premixed mode while the second flow passage of the heat exchanger receives a circulation of the heat transfer medium.

11. The method of claim 10, further comprising transferring heat from a flow of exhaust through the first flow passage of the heat exchanger to the heat transfer medium in the second flow passage of the heat exchanger.

12. The method of claim 7, wherein the heat transfer medium is a liquid and the purge fluid is a gas.

13. The method of claim 7, wherein the purge fluid is air.

14. The method of claim 9, wherein the substantially premixed mode is one of a homogeneous charge compression ignition (HCCI) mode and a piloted-HCCI mode.

15. The method of claim 9, wherein a gaseous fuel composes more than 90% of a total amount of fuel received, by heating value, during the substantially premixed mode.

16. The method of claim 10, wherein the substantially non-premixed mode is a conventional direct-injection compression ignition mode.

17. An internal combustion engine, comprising:
  a block defining a cylinder bore therein;
  a piston disposed in reciprocal sliding engagement with the cylinder bore, the cylinder bore and the piston defining a variable volume;
  an exhaust duct in selective fluid communication with the variable volume;
  an intake duct in selective fluid communication with the variable volume;
  an EGR duct in fluid communication with the exhaust duct and the intake duct;
  a heat exchanger having a first flow passage and a second flow passage, the first flow passage being in fluid communication with the EGR duct, the second flow passage being in fluid communication with a heat transfer medium source;
  an upstream purge valve in fluid communication with the second flow passage of the heat exchanger, and configured to effect selective fluid communication between a purge fluid source and the second flow passage of the heat exchanger, the purge fluid source being distinct from the heat transfer medium source; and
  a controller operatively coupled to the upstream purge valve, the controller being configured to purge the second flow passage of the heat exchanger at least in part by opening the upstream purge valve.

18. The engine of claim 17, wherein the controller is further configured to operate the engine in a substantially premixed combustion mode in connection with opening the upstream purge valve.

19. The engine of claim 17, further comprising a supply valve in fluid communication with the second flow passage of the heat exchanger, the supply valve being configured to effect selective fluid communication between the heat transfer medium source and the second flow passage of the heat exchanger,
  wherein the controller is further configured to close the supply valve while the upstream purge valve is open.

20. The engine of claim 19, further comprising:
  a downstream purge valve in fluid communication with the upstream purge valve via second flow passage of the heat exchanger; and
  a return valve in fluid communication with the supply valve via the second flow passage of the heat exchanger,
  wherein the controller is further configured to open the downstream purge valve and close the return valve while the upstream purge valve is open.

* * * * *

UNITED STATES PATENT AND TRADEMARK OFFICE
CERTIFICATE OF CORRECTION

PATENT NO. : 9,551,303 B2  
APPLICATION NO. : 14/489685  
DATED : January 24, 2017  
INVENTOR(S) : Ge et al.

Page 1 of 1

It is certified that error appears in the above-identified patent and that said Letters Patent is hereby corrected as shown below:

Column 14, Line 46, In Claim 2, delete "The system of claim 1," and insert -- The EGR system of claim 1, --.

Signed and Sealed this  
Second Day of May, 2017

Michelle K. Lee  
*Director of the United States Patent and Trademark Office*